Aug. 20, 1929.  H. H. FROST  1,725,184
SHOCK ABSORBER SOCKET
Filed Dec. 8, 1924   3 Sheets-Sheet 1
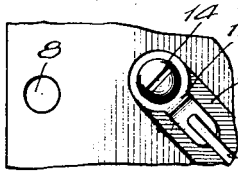
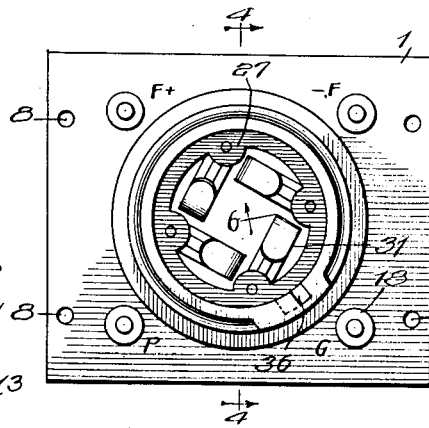
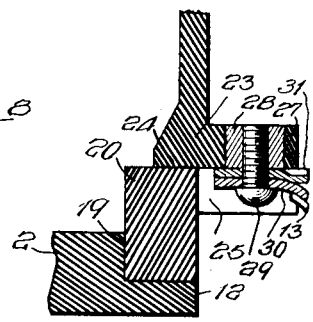
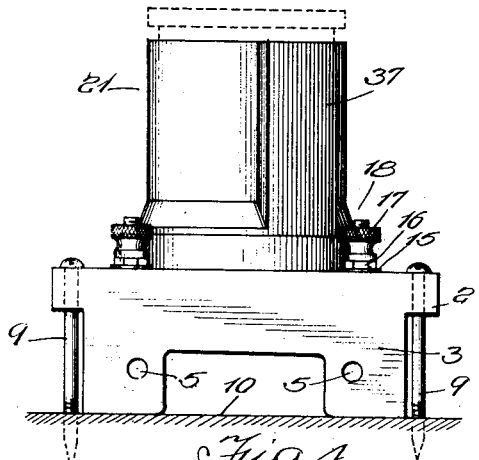
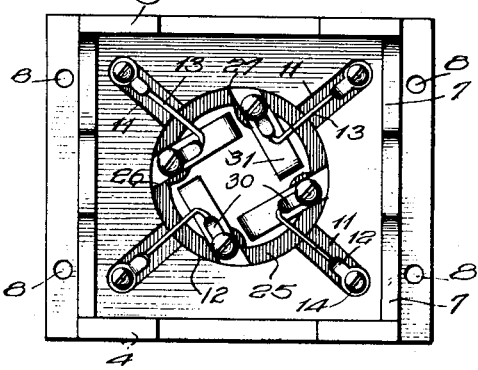
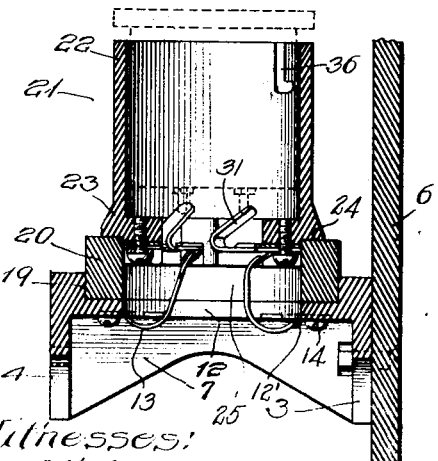
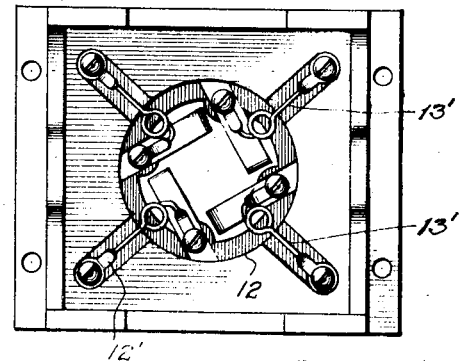
Inventor:
Herbert H. Frost Aug. 20, 1929.  H. H. FROST  1,725,184
SHOCK ABSORBER SOCKET
Filed Dec. 8, 1924    3 Sheets-Sheet 2
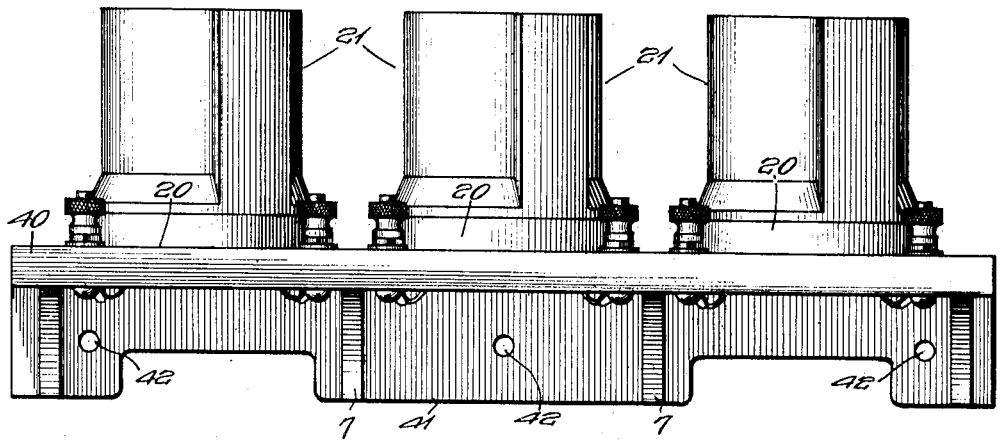
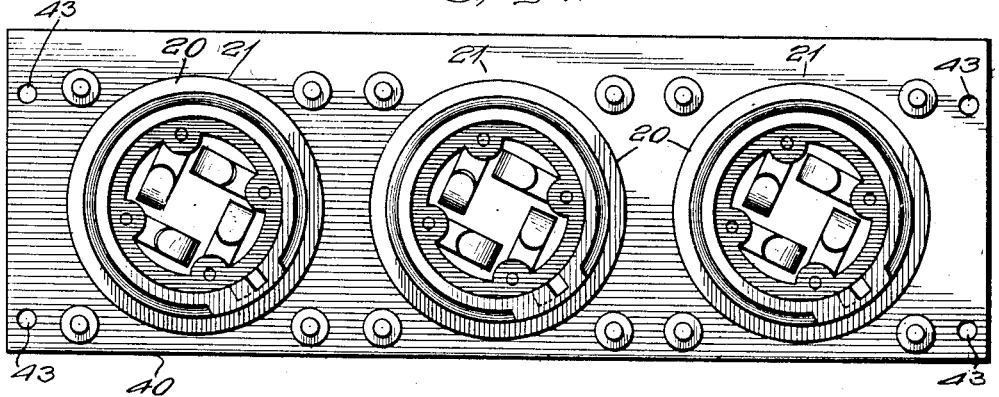
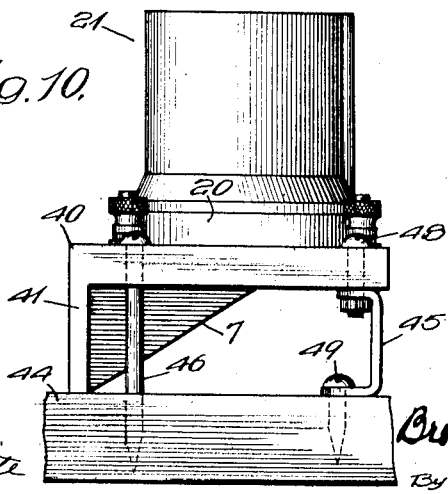

Aug. 20, 1929.  H. H. FROST  1,725,184
SHOCK ABSORBER SOCKET
Filed Dec. 8, 1924  3 Sheets-Sheet 3

Witnesses:
W. F. Kilroy
Harry R. L. White

Inventor:
Herbert H. Frost
Brown, Boettcher & Dienner
By Att'ys

Patented Aug. 20, 1929.

1,725,184

UNITED STATES PATENT OFFICE.

HERBERT H. FROST, OF CHICAGO, ILLINOIS, ASSIGNOR, BY MESNE ASSIGNMENTS, TO CHICAGO TELEPHONE SUPPLY COMPANY, OF ELKHART, INDIANA, A CORPORATION OF DELAWARE.

SHOCK-ABSORBER SOCKET.

Application filed December 8, 1924. Serial No. 754,511.

My invention relates to sockets for mounting bulbs or tubes such as are employed in connection with radio work. While the specific use to which I have put the preferred form of the invention is that of mounting electron tubes, it is to be understood that the invention is not to be limited to that particular use.

Electron or thermionic tubes are subject to disturbance by mechanical vibration and it is desirable to shield them from such disturbance. It is known heretofore to be advisable to mount telephone apparatus and, in fact any apparatus which is adversely affected by mechanical vibration, upon a soft or dead pad to prevent the transmission of such vibration thereto. Such soft or dead pads have the property of frictionally absorbing vibration, particularly vibration of frequency of sound or higher frequency. Sponge rubber, and felt are well known media for absorbing such vibrations or shocks.

It has been found to be difficult to provide a suitable socket or mounting embodying such pad or shock absorber. One difficulty to be met is the need for holding the socket against axial pressure and also against twisting stress. This is necessary because the present commercial type of tubes of this character employs a pin and bayonet slot as the mechanical connection between the base of the tube and the socket. This requires an axial movement and a rotary movement. Such shock absorbing material as sponge, rubber, felt and the like, are of relatively low strength and are difficult to attach to the parts.

I find also that care must be taken to prevent the transmission of vibration or shock from or through the connecting wires or conductors.

According to my present invention I provide a mounting consisting of a complete socket with spring contact and bayonet slot for engaging the base and contact studs of the tube, and below the socket I provide a sub-base or frame between which sub-base or frame and the base of the socket, I mount a ring of soft sponge rubber. Other yielding material beside sponge rubber may be employed, but I have found the same so far to be the most satisfactory that I have encountered.

The sub-base may be attached to a frame or may be mounted upon a base board or upon a table, or to a panel, suitable legs and brackets being provided. Binding posts or other suitable terminals are mounted on the sub-base and they are connected to the spring contacts of the socket through suitable pigtails or leads which preferably are made of fine strands of soft wire braided together. I have also employed fuse wire of small capacity in order to protect the tubes against excessive current as well as against the transmission of vibration or shock.

The ring of rubber is cut from a sheet with top and bottom layers relatively non-porous and the cut edges are porous. The upper inside and lower outside corners of the ring fit in corresponding corners in the base of the socket and the top of the sub-base or frame.

Thus both a plane and a cylindrical surface are available for cementing the parts together. The parts are so proportioned that for axial pressure on the socket, the pad will be put into compression, thus avoiding tearing loose of the cemented joints which I find to be difficult to make.

In addition to the above, I provide numerous detailed improvements such as the spring contacts, the mounting of the terminals, and the like, all of which will be apparent from the following detailed description and claims.

Now in order to acquaint those skilled in the art with the manner of constructing and operating a device embodying my invention, I shall describe in connection with the accompanying drawings, a specific embodiment thereof.

In the drawings:

Figure 1 is a plan view of a device embodying my invention;

Fig. 2 is a front elevational view of the same;

Fig. 3 is a bottom plan view;

Fig. 4 is a section taken on the line 4—4 of Fig. 1;

Fig. 5 is a bottom plan view of a modification;

Fig. 6 is a fragmentary section through one of the contact springs;

Fig. 7 is a fragmentary enlarged view showing one of the terminals;

Fig. 8 is a front elevational view of a gang of three sockets mounted on a common sub-base;

Fig. 9 is a top plan view of the same;

Fig. 10 is an end elevational view of the same mounted upon a base board or table;

Figure 11:
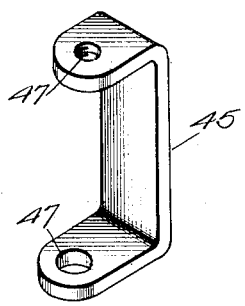
Fig. 11 is an isometric view of a separate leg.

In the embodiment illustrated in Figs. 1 to 4, I provide a sub-base 1 of molded bakelite, or the like, comprising a top plate 2 and depending flanges 3 and 4, which extend down flush with the edges of the plate 2. These depending flanges or brackets have holes 5 formed therein to permit mounting of the device upon a panel such as 6, as indicated in Fig. 4. These brackets or depending flanges 3 and 4 are connected by re-enforcing webs 7 which are formed integral with the base plate 1. The base plate 2 has a number of screw holes formed therethrough vertically, as indicated at 8 in Fig. 1, to permit suitable screws such as wood screws 9, shown in Fig. 2, to extend down into a base or table 10, as shown in Fig. 2. From this it can be seen that the base 1 is adapted to be mounted either upon a panel or table, or the like, in a convenient and satisfactory manner.

If desired, a number of these sub-bases 1 may be bolted together sidewise to form a gang or group of mounting sockets, if so desired.

Upon the back or bottom side of the plate 2, I form shallow grooves 11 radiating out from the central aperture 12 in said plate 2. In the shallow grooves 11 are seated flat terminal clips 12' to which are connected flexible cables 13 formed of stranded wire, the ends of which cable are soldered to the terminal clip 12'. The terminal clip 12' is formed like a flat washer with an extending ear which is bent up out of the plane of the main part of the body or washer. Suitable screws 14 pass through the washer portion of the terminal clip 12' and hold the same firmly against the bottom of the groove. The raised portion or ear, which lies out of the plane of the main body portion and to which the cable 13 is connected, prevents accidental turning of the terminal, as might be the case in assembly and which would result in injury to the cable or to the connected parts. The screws 14 extend up through the plate 2 to form electrical terminals. There are four of such screws 14 for each socket and these screws have at their upper ends above the plate 2 washers 15, lock nuts 16, and thumb screws 17, forming a suitable electrical terminal for connection to the conductors of the radio set.

These terminals 18 are disposed at the corners of the plate 2 sufficiently removed from the margin of the plate to permit convenient attachment of the conductors, even when the socket is mounted upon a panel, as indicated in Fig. 6.

The plate 2 has a counter bore or annular shoulder 19 about the central opening 12 and in this annular shoulder is seated a ring of sponge rubber 20, which is punched out of a sheet of this material, leaving the top and bottom surfaces of the ring 20 substantially imperforate, that is, the pores of the sponge rubber are closed at the top and bottom surface of the ring. The inside diameter of the ring 20 is substantially the same as the diameter of the hole 12 so that the ring secures full support from the plate 2 when the socket is depressed. A socket member 21 comprising a generally cylindrical shell 22 and a base 23 is mounted upon said rubber ring 20. The base 23 comprises an outwardly flaring portion forming an annular shoulder 24 between the horizontal plane surface of the base 23 and the depending cylindrical portion 25. The depending cylindrical portion is of a diameter equal to the inside diameter of the cushion ring 20. This depending cylindrical portion 25 has slots 26 formed therein, in register with the lugs 27 which extend in radially at the base 23. These lugs 27 preferably contain metallic inserts 28 molded in the body of the socket 21 and these inserts are adapted to receive the screws 29 for clamping the terminals 30 and contact springs 31. If desired, the inserts may be omitted and the screws threaded directly into the body of the lugs.

Figure 12:
Fig. 12 is an isometric view of one of the contact springs.
Figure 13:
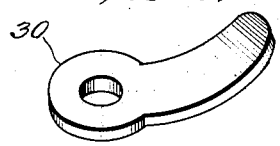
Fig. 13 is a detail view of a terminal washer.
Figure 14:
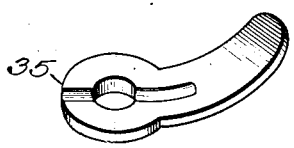
Fig. 14 is a similar view of a modified form of terminal washer.

The terminals 30 are constructed like the terminals 12 of a washer portion with an integral ear or tap to which the cable 13 is soldered. This cable is of a flexible or dead character, so as to be substantially incapable of transmitting vibration. The contact springs 31 are perforated as at 32 to receive the screws 29. These springs are generally J shaped, as will be apparent from Fig. 12, the longer legs containing the perforation 32 and having a longitudinal crease or channel 33 formed therein by stamping to stiffen this portion of the springs, as it is desired to secure the major part of the flexibility in the contacting arm 34 or the bend immediately adjacent the same. That is to say, it is undesirable to let the spring bend at the point of attachment under the screw 29 or other attaching means, because the hole weakens the same and for this reason the major portion or shank is re-enforced as indicated at 33. This re-enforcement is augmented by the mode of attaching the terminal lug 30. This lug is clamped on top of the spring 31 at the hole 32 and the washer 30 serves, therefore, not only as electrical connecting means, but also as mechanical re-enforcing means. To this end, if desired, the corrugation or crease 33 may be carried completely across the end of the spring and a corrugated washer, as indicated at 35 in Fig. 14, may be substituted for the plain washer shown at 30 in Fig. 13. I find, however, with the form of spring shown in Fig. 12 and the washer shown in Fig. 13, sufficient re-enforcement of the main or shank portion of the spring is obtained to secure the major part of the flexing at the bend between the finger 34 and the main part of the spring.

These springs 31 are held in recesses formed in the axial extension 25, as will be apparent from Fig. 6 and Fig. 4, and the sides of the recesses have shoulders contacting with the edges of the springs so that the springs 31 are restrained against rotary movement on the screws 29, being held between the parallel or substantially parallel shoulders of the recess.

The socket 21 contains a bayonet slot 36 which is molded in place in the side wall of the sleeve member 22. This bayonet slot 36 is in a thickened wall 37 which extends uniformly from the lip or rim of the sleeve 22 down to the tapered shoulder of the base 23. This stiffens the sleeve 22 and at the same time permits of sufficient stock being formed about the bayonet slot to prevent breakage. The thickened portion is carried down to the base also for the purpose of permitting the same to clear the dies, this sleeve being formed of Bakelite, or the like.

The springs 31 are so formed that, upon rotation of the base of the tube or other connective apparatus to fasten the same in the bayonet slot 36, it will produce firmer contact between the contacts of such bulb, adapter, or the like, with the springs 31, since the same are inclined in such a position that moving the pin of the base into the bayonet slot of the socket causes the contacts of the base to ride up on the inclined surfaces of the springs 31.

In Fig. 5 I have shown a modification in which the cables 13' are made of fuse wire, that is, an alloy of lead or tin, or the like, such wire being sufficiently dead mechanically as to transmit little, if any, mechanical vibration and containing further the electrical safety provision of preventing excessive current flow through the filament. That is to say, the fuse wire 13' is of a capacity suitable for interrupting excessive current flow through the filament of the connected tube. I find that this form of the invention has the draw back of introducing unnecessary resistance in the circuit. This may be overcome by inserting only a short length of fuse wire in the circuit of the filament.

In Figs. 8, 9 and 10, I have indicated a gang of sockets in which the individual socket members 21, which in all respects are the same as illustrated in detail in Figs. 1 to 7, may be mounted upon a common sub-base having a common base plate 40 forming an integral support for the sockets, these sockets having the rubber rings 20 forming the mechanical connection between the sockets and the base plate 40. The base plate 40 has depending flanges along one side as indicated at 41 in Figs. 9 and 10, similar to the flanges 3 or 4 in the previously described form. In the present construction, I have shown the flange 41 as extending along one edge of the plate 40 and provided with suitable bolt holes 42 for mounting the flanges against a panel, or the like, but it is to be understood that such flanges may be formed along either side or both sides of the base plate 40. Suitable screw holes 43 are formed through the base plate 40 for the purpose of permitting the mounting of this gang of sockets upon a table or like base 44, as indicated in Fig. 10. Where this is desired, the sheet metal legs 45 may be employed, the leg may be bolted to the base plate 40 by means of the bolt 48 and the lower part of the leg secured to the table or base 44, as by means of the screw 49. The construction of the contacts in the socket 21 shown in Figs. 8, 9 and 10, is identical with that shown in the modification of Figs. 1 to 4, inclusive.

Figure 15:
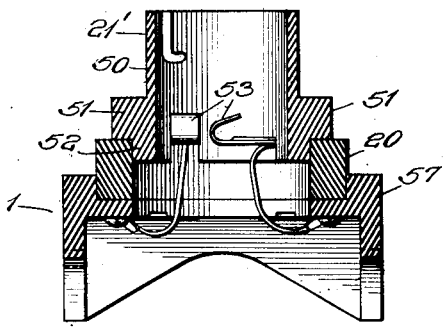
Fig. 15 is a vertical section through a modified form of socket for mounting tubes such as UV–199 or C–299.
Figure 16:
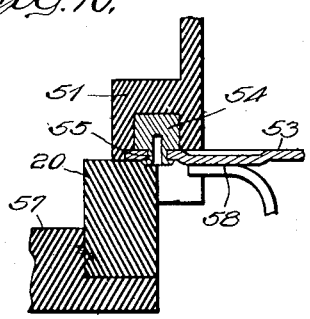
Fig. 16 is an enlarged sectional view indicating the manner of attaching the springs.
Figure 17:
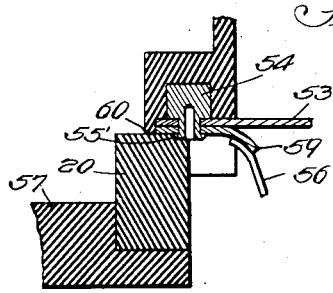
Fig. 17 is a similar view of a modified form of the same.

The socket shown in Figs. 15, 16, and 17 is adapted to receive smaller tubes than the socket shown in Figs. 1 to 10, inclusive. The socket shown in the latter form is adapted to receive tubes such as the "C-299" or "U V-199" tubes.

The connections made in this construction constitute a modification.

In this construction the socket 21' comprises a barrel member 50 and a base member 51 which has a downwardly extending cylindrical portion 52 which has recesses or notches cut therein to receive the springs 53, which are substantially like the springs 31 heretofore described. The springs 53 are connected to the base 51 of the socket 21' through the medium of an insert 54, which is molded in place in the body of the socket. This insert 54 has a tubular extension 55 in the shape of a neck of smaller diameter than the main part of the insert. The end of the spring 53 has a hole which fits this neck and then the outer edge of the neck is spun down or riveted down over the spring to hold the same firmly in place. The conductor 56, which corresponds to the conductor 13 shown in Figs. 1 to 4, leads to the stationary binding post mounted upon the plate or base 57 which may be a part of a single sub-base or a gang sub-base.

This cable 56 may be attached to the spring 53 as by soldering, as indicated at 58.

In Fig. 17 I have indicated a similar mode of mounting the spring 53 as by means of the insert 54. In this case, however, the conductor or cable 56 is soldered at 59 to a small terminal washer, having an integral ear such as that shown in Fig. 13 or Fig. 14, and this terminal washer 60 is secured over the bottom of the spring 53 by the riveted over neck 55' which is an integral part of the insert 54. Thus the soldering of the cable 56 to the terminal 60 does not draw the temper of the spring as is the case where the soldering of the cable 56 is directly to the spring 53.

In other respects the socket 21' is like the socket described in Figs. 1 to 4. The rubber ring 20 is the same in size and shape as that employed in the embodiment of Figs. 1 to 4.

I have found that it is rather difficult to secure a good contact between the Bakelite and the soft rubber and for this reason I find it advisable at times to roughen the co-operating surfaces. The cement which I prefer to employ is collodion. This is an ether and alcohol solution of pyroxyline.

I do not intend to be limited to the details shown or described except as the same appears in the appended claims.

I claim:

1. A non-microphonic mounting for an electron tube comprising a socket bearing spring contacts for co-operation with the tube, a sub-base having a hole therethrough, a ring of non-microphonic material between said socket and sub-base, said ring surrounding said hole, and flexible leads from the spring contacts extending through said hole and being secured to said base.

2. A non-microphonic mounting for a plurality of tubes comprising a plurality of sockets bearing spring contacts for co-operating with the tubes which they mount, a sub-base having a plurality of holes therethrough corresponding to said sockets, rings of non-microphonic material between said sockets and said sub-base, said rings surrounding said holes, and flexible leads from the spring contacts extending through said holes and being secured to said sub-base.

3. A socket of the class described comprising a cylindrical barrel having a base, said base having an outwardly extending annular flange, an inwardly extending flange having lugs, said lugs having shoulders at their sides, springs mounted on said lugs and engaging said shoulders, a sub-base, and a pad of vibration absorbing material between said flange and said base.

4. In combination, a socket comprising a cylindrical barrel having a base, said base having an outwardly extending flange, inwardly extending lugs, springs mounted on said lugs, a pad of vibration absorbing material secured to said flange and having a central hole, and flexible leads passing through said hole from said springs.

5. In combination, a cylindrical barrel having a base, said base comprising an outwardly extending flange, inwardly extending lugs having shoulders, springs mounted on said lugs and engaging said shoulders, a pad of vibration absorbing material, a sub-base below said pad, terminals mounted on the sub-base, and flexible leads extending from said springs through said pad and connected to said terminals.

6. In combination, a base having a plurality of terminals, a pad of vibration absorbing material mounted on said base, a socket comprising a cylindrical barrel member and an outwardly extending flange at its base seating on said pad, said socket having inwardly extending lugs, contact springs mounted on said lugs and flexible leads extending from said springs through said pad and through the sub-base and being connected to said terminals.

7. A socket of the class described comprising a cylindrical barrel having a base, said base having an outwardly extending annular flange, a cylindrical extension below the same, an inwardly extending flange having lugs, parallel sided recesses being formed in said lugs, contact springs having their ends seated in said recesses, means for holding said springs in said recesses and flexible leads connected to said springs.

8. In combination, a socket member having a hollow cylindrical barrel, lugs extending radially inward from the lower portion of said barrel, said lugs having spring seats, J shaped springs disposed diagonally in said barrel, the longer legs of the springs being secured in said seats, a vibration absorbing pad secured to the socket, said pad comprising an annular ring, a sub-base for supporting the ring, terminals on said sub-base and flexible leads extending from said terminals to said springs.

9. In combination, a socket member having a hollow cylindrical barrel, a plurality of lugs having parallel sided recesses extending inwardly from the lower portion of said barrel, J shaped springs having the longer legs thereof disposed in said recesses, metal inserts in said lugs, means for fastening said springs in said seats to said metal inserts, a sub-base, an annular vibration absorbing pad between the sub-base and said lugs, terminals on said sub-base, and flexible leads from said springs to said terminals, said leads projecting through said ring.

10. In combination, a sub-base of insulating material, a socket comprising a cylindrical shell of insulating material, said base having a hole in register with said shell, said sub-base and shell having opposed annular recesses of rectangular cross section, a cylindrical ring of vibration absorbing material seated in said recesses, terminals on said base and shell, and anti-vibration conductors connecting said terminals and extending through the hole in said sub-base.

In witness whereof, I hereunto subscribe my name this 2nd day of December, 1924.

HERBERT H. FROST.